Jan. 8, 1952  G. AMANATIDES  2,581,570
UPRIGHT BROILER
Filed Oct. 26, 1949  3 Sheets-Sheet 1
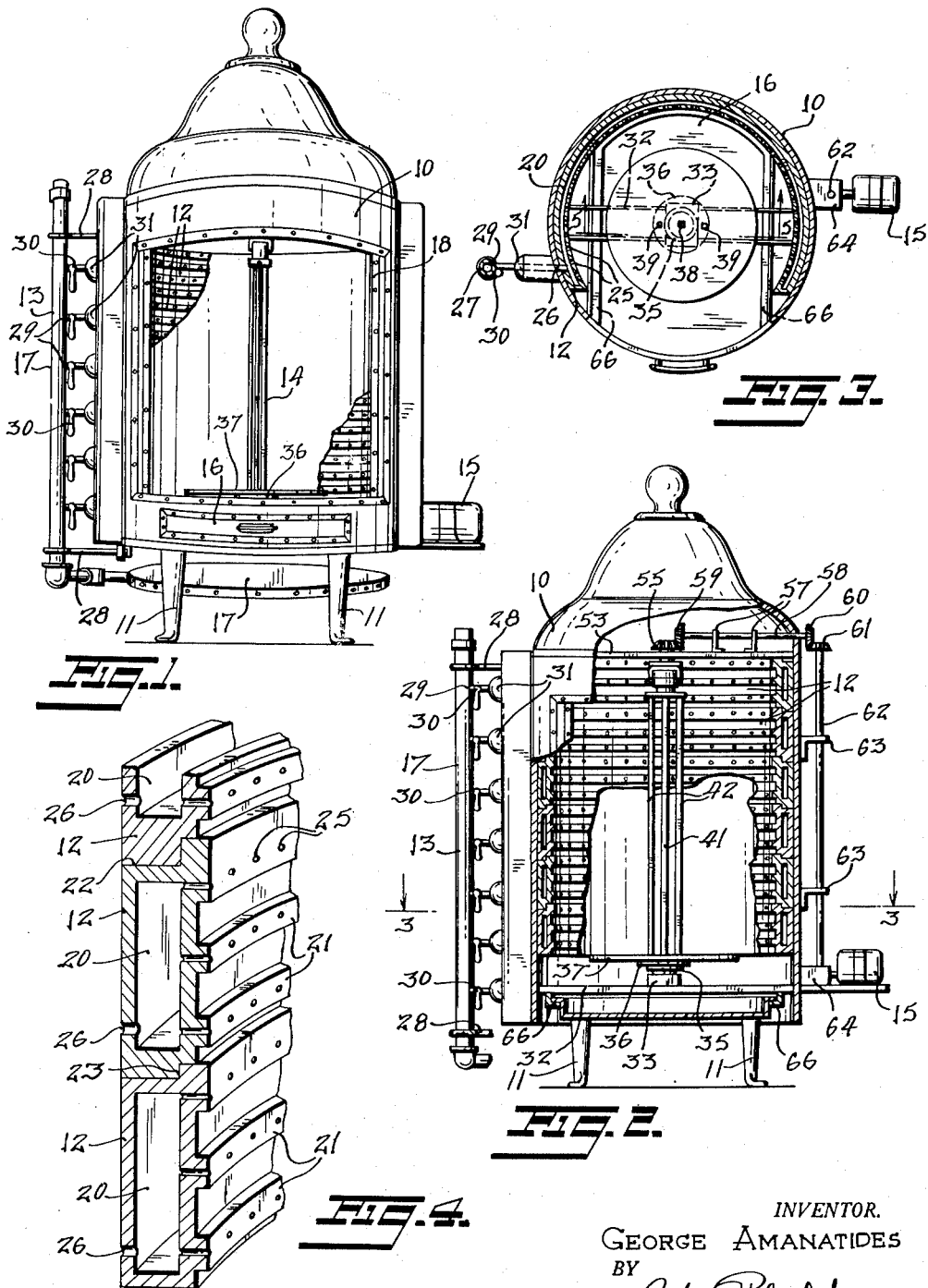
INVENTOR.
GEORGE AMANATIDES
BY
ATTORNEY

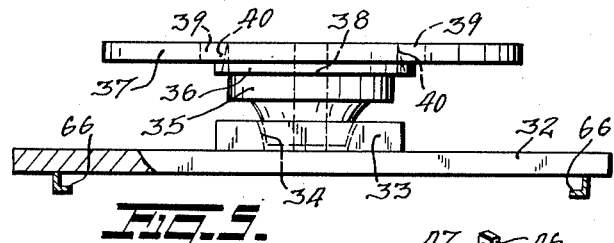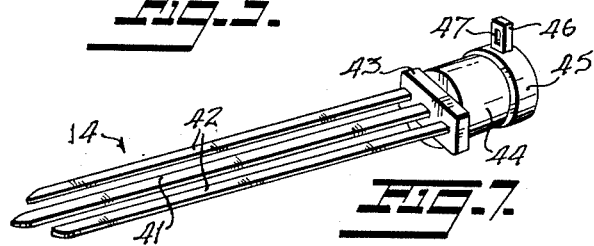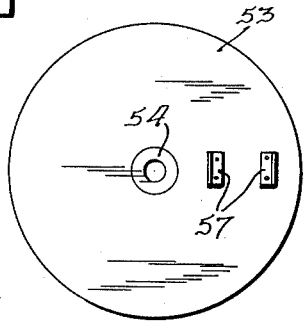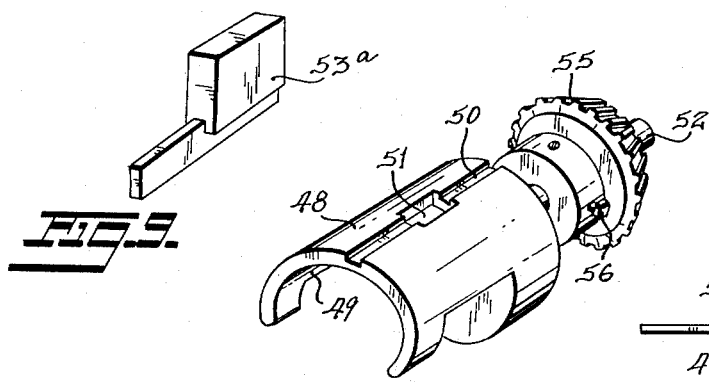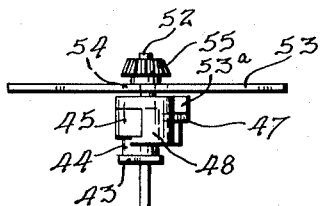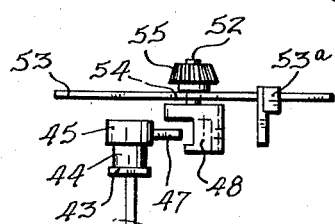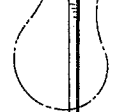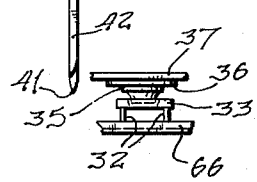

Jan. 8, 1952     G. AMANATIDES     2,581,570
UPRIGHT BROILER

Filed Oct. 26, 1949     3 Sheets-Sheet 3

INVENTOR.
GEORGE AMANATIDES
BY
ATTORNEY

Patented Jan. 8, 1952

2,581,570

UNITED STATES PATENT OFFICE 2,581,570

UPRIGHT BROILER

George Amanatides, New York, N. Y.

Application October 26, 1949, Serial No. 123,629

3 Claims. (Cl. 99—421)

This invention relates to improvements in meat broilers and pertains particularly to an upright gas broiler including means for rotating constantly a piece of meat therein.

One object of the present invention is to provide a gas broiler having included therein a multiplicity of flame providing jets, in order that sufficient heat may be supplied to all portions of a piece of meat therein.

Another object of the present invention is to provide a gas broiler having included therein a multiplicity of flame providing jets which are divided into a plurality of groups, and which groups may each be controlled independently in order to thus provide a means for controlling the cooking of a piece of meat therein.

Another object of the present invention is to provide in an upright gas broiler an upright spit for receiving a piece of meat thereon and holding same during the cooking process thereof.

Another object of the present invention is to provide in a gas broiler including a spit therein, motor driven means for rotating said spit constantly and slowly.

Another object of the present invention is to provide in an upright gas broiler an upright spit which may be readily and easily removed therefrom for the loading of meat thereon or the removal of cooked meat therefrom, and which may also be readily and easily replaced in operable position in said broiler.

Another object of the present invention is to provide in an upright gas broiler including an upright spit, means effective when said spit is operatively positioned for preventing meat placed thereon from sliding to the lower extremities thereof.

Another object of the present invention is to conserve fuel by the provision of means for shutting off those gas jets adjacent portions of meat which might cook faster than others.

A further object of the present invention is to provide means for controlling the broiling of a piece of meat to thereby assure a uniformity of cooking therethrough.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front elevational view of the present device and illustrates the relative dispositions of the various components thereof.

Fig. 2 is a broken away front elevational view of the device illustrating the interior thereof.

Fig. 3 is a sectional view taken along the lines 3—3 of Fig. 2 and illustrates the arcuate configuration of the several gas burners and the spit end-receiver.

Fig. 4 is a sectionalized isometric and fragmentary view of the gas burners and illustrates the configuration thereof and multiplicity of jets therein.

Fig. 5 is a front elevational detail showing the spit end-receiver, the bearing therefor, and the cross bars upon which said bearing is mounted.

Fig. 6 is a plan view of the top plate illustrating the hub bearing and the brackets for the horizontal drive shaft.

Fig. 7 is an isometric view of the spit showing the head thereof and the tongue projecting therefrom and formed integral therewith.

Fig. 8 is an isometric view illustrating the spit hub and the bevel gear fast thereon.

Fig. 9 is an isometric view of the key for associating with the spit tongue and the hub to lock the head of said spit in the said hub.

Fig. 10 is a side elevational detail view of the spit hub, the spit, and the spit end-receiver, and shows the said spit in unassociated relation with the other mentioned components.

Fig. 11 is a side elevational detail view showing the components seen in Fig. 10 in an associated relation.

Fig. 13 is an isometric view of the slidable drip pan and the angles for the same to slide on.

Figure 12:
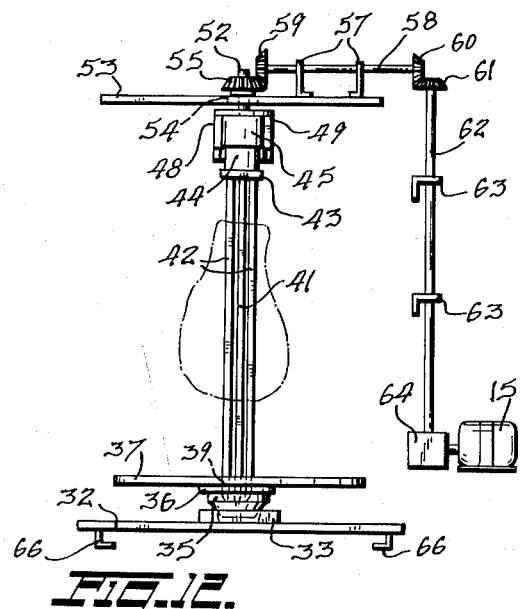
Fig. 12 is a front elevational detail view showing the spit in operative position and the driving means and transmission therefor.

The broiler, according to the present invention, includes a cylindrical housing 10 mounted on legs 11 and having a plurality of gas burners 12, a manually controllable gas supply 13, a meat receiving spit 14, an electrical motor 15 for rotating said spit through suitable transmission means, a drip pan 16 for catching the drippings of meat broiled in the device, and a protector plate 17 for protecting the surface of the counter or table upon which the device may rest from hot fat and possible resultant conflagration.

The cylindrical housing 10 is provided with a frontal opening 18 which may be provided with an insulated door for retaining all the heat possible therein or may be left open or provided with a transparent door in order that the broiling of the meat may be viewed by a chef or restaurant patrons. Neither of the just mentioned provisions need be nor will be herein described.

The above mentioned gas burners 12, as seen in Figs. 2, 3 and 4 are of arcuate configuration in order to provide for the mentioned frontal opening 13. Said burners may be cast of iron, formed of fire-brick, or any similar material which may be suitably formed and which can withstand high temperatures during substantially lengthy periods. As best seen in Figs. 3 and 4, each burner is formed to provide a hollow passage 20 therein and several spaced apart ribs 21 on the internal periphery thereof. Each burner is further formed to provide a groove 22 in the upper outer edge thereof and a similar groove 23 in the lower inner edge thereof. By means of said grooves the burners 12 are adapted to be rabbeted together and piled vertically. Jets 25, in suitably spaced relation, are provided in the spaced-apart ribs 21 and are formed as by drilling to connect with the said hollow passage 20. Adjacent the left-hand extremity of each of the said burners 12 is provided an inlet 26 for the heretofore mentioned manually controlled gas supply, which is about to be described.

The arrangement by which gas is supplied to the several burners comprises a stand pipe 27 which has the lower end thereof fitted by suitable plumbing to any satisfactory source. Said stand pipe is maintained in its vertical position by brackets 28 suitably affixed to the cylindrical housing 10. At spaced apart positions the said stand pipe 27 is tapped as at 29 by pipes having manually controllable jet valves 30 therein. Said jet valves 30 are connected to related ones of said burners at the burner inlets 26. However, interposed between said valves and said burners are air-mixers 31, which mixers are common to all gas ranges and the purposes for which are well-known and need not be herein explained.

The just described arrangement permits the provided burners 12 to be effective as a battery or selectively, the importance of which will be hereinafter more evident.

Now, seen in Figs. 2, 3 and 5, two parallel cross bars 32 are provided and extend across the cylindrical housing 10 near the bottom thereof. Secured to the upper sides thereof, as by welding, at substantially the center of the housing 10 is a bearing plate 33 having a bearing hole 34 centrally disposed therein. Adapted to bear in said hole 34 is a rotatable hub 35 having fixed to the upper surface thereof a first plate 36 of greater circumference than said hub, and fixed to the upper surface of said first plate 36 is a second plate 37 of still greater circumference. A square hole 38 extends axially through said hub 35, first plate 36, and second plate 37, and two other holes 39 are provided in said second plate 37 on either side of said square hole 38. As particularly well seen in Figs. 3 and 5 said other holes 39 are formed with the outer sides thereof rounded and the inner sides flat. Said inner sides are also inclined inwardly, thereby providing camming surfaces 40 (Fig. 5), the reasons for which will be set forth hereinafter.

The aforementioned spit 14 (Figs. 2 and 7) is formed of steel preferably and is provided with a central tine 41 of substantially square cross-section, and two outer tines 42 of similar cross-section but with the outermost surfaces of the free ends thereof rounded. Said tines 41 and 42 are all provided with acuminate ends to facilitate the piercing of meat thereby. The upper extremity of the spit 14 is formed to provide a yoke 43 and a cylindrical head 44, the upper portion of which head is formed with an annular rib 45. Extending rearwardly and radially from said rib 45 is an integral tongue 46 being provided with a vertical slot 47.

Adapted to associate with the spit head arrangement is a hub 48 being substantially cylindrical and hollow with the front portion thereof cut away (Figs. 8, 10, 11 and 12). Said hub is further configured to provide an internal annular groove 49, a vertical keyway 50 in the side opposite the cut away front portion, an aperture 51 in said keyway and through the side of the hub, and a cylindrical stem 52 extending axially from the top of said hub.

The cylindrical head 44 of the spit 14 is adapted to fit in the said hub 48, having the tongue 46 thereof fit in the aperture 51 of the hub and the annular rib 45 fit matchingly in the internal annular groove 49 in the hub. When so fitted the spit and hub are securely held together through the agency of a key 53ᵃ (Fig. 9) which associates with both the keyway 50 in the hub and the vertical slot 47 in the spit tongue 46.

Now, as seen in Figs. 2, 6 and 12 a top plate 53 is mounted in the upper portion of the cylindrical housing 10, which plate is provided with a centrally disposed bearing sleeve 54 of bronze or similar bearing material. In order to hold the hub 48 in position the stem 52 extending therefrom is inserted in the said bearing sleeve 54 and a bevel gear 55 is fastened thereon by a set screw 56 above the bearing sleeve.

Mounted on the upper surface of the top plate 53 is a pair of brackets 57 (Figs. 2, 6 and 12) which support a horizontal drive shaft 58 having fast on its inner end a bevel gear 59 enmeshed with the hub bevel gear 55, and a second bevel gear 60 similarly fitted on the outer end thereof which extends through the above-mentioned cylindrical housing 10. Adapted to associate with said second bevel gear 60 is a driving bevel gear 61 securely fitted on the upper end of a vertical drive shaft 62, which shaft is supported in its vertical position by side brackets 63 fixed to the cylindrical housing 10. The lower extremity of the said shaft 62 enters a gear box 64, the internal mechanism of which are not herein described but which reduce the revolutional output of the motor 15 sufficiently to cause the hub 48 and spit 14 to rotate at a speed suitably slow and favorable to the broiling of a piece of meat.

Figure 13:
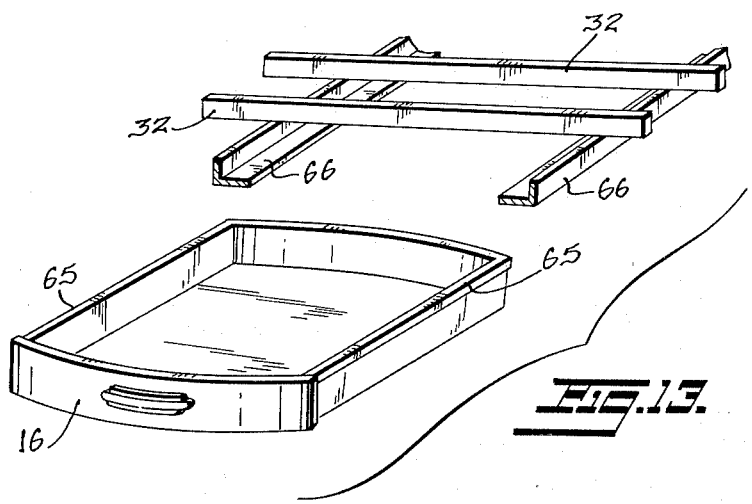

The above-mentioned drip pan 16, as seen best in Figs. 1 and 13 is much similar to any drawer but which is provided with runner edges 65 on either of the upper edges of the sides thereof. Said runner edges are adapted to cooperate with inwardly pointing angles 66 secured, as by welding, to the undersides of the cross bars 32. Thusly arranged the drip pan 16 covers substantially the whole bottom of the cylindrical housing and may be slid out of said housing for the removal of meat drippings therefrom and the cleansing thereof.

In operation the burners 12 are lit safely by the turning of the lowermost valve 30 to its "on" position and the subsequent lighting of the related burner with a match or similar means. Thereafter the other valves may be turned "on" one after the other from the bottom to the top, thereby causing the related burners to light seriately, each one being lit by the flames projecting from its preceding one. Thusly lit, a multiple of centrally directed flames are emitted from the jets 25 in the said burners 12.

Now assuming that the spit 14 is first removed from the broiler, a piece of meat to be broiled is loaded thereon through the impalement thereof by the spit tines 41 and 42. At this point the spit is not yet operatively positioned in the broiler (Fig. 10). To so operatively position the said spit the center tine 41 is positioned in the square hole 38 and the outer tines 42 are positioned in the other holes 39 of the spit end-receiver (Figs. 3, 5 and 12).

The above-mentioned camming surfaces 40 in the said other holes 39 are at this time effective and engage the inner surfaces of the acuminate ends of the said outer tines 42, to thereby spread said outer tines. This spreading of the said outer tines 42 effects a tightening thereon of the mentioned piece of meat and prevents the same from sliding down to the lower extremities of the said spit and resting on the plate 37.

The head 44 of the spit is then fastened in the hub 48 in the manner hereinabove described and seen in Fig. 11. Subsequently, switching means not herein shown effect the running of the motor 15, and through the gear reduction box 64, the vertical shaft 62, the cooperating bevel gears 60 and 61, the horizontal shaft 58, the inner bevel gear 59, and the hub bevel gear 55, the said hub 48 is rotated suitably slow, effecting the turning therewith of the spit 14 and the meat thereon, and the said spit end-receiver which bears on the edge of the hole 34 in the bearing plate 33.

Now, inasmuch as the cross-sectional thicknesses of any piece of meat is seldom uniform throughout its length, it is correct to presume that certain less thick portions thereof will be cooked therethrough much sooner than others, and to continue directing heat on said portions would serve only to dry them out and waste fuel. Therefore, it is possible by means of the mentioned valves 30 to turn off those burners 12 adjacent the already cooked portions of meat.

Also, upon the completion of the broiling process the entire spit 14 bearing the meat thereon is easily removable from the broiler by the removal of the mentioned key 53 from the slot 47 in the tongue 46, which disassociates the head 44 of the spit from the hub 48. With the spit head 44 thusly detached from the hub, the spit tines 41 and 42 are readily removable from their related holes in the spit end-receiver, and inasmuch as the outer tines 42 were spread in the manner hereinabove described in order to hold the meat properly thereon, their removal from their related holes permits them to assume their normal positions. This, in effect, loosens the grip of the meat thereon and permits of a facilitated removal thereof.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In an upright broiler of the class described including a cylindrical housing the combination of; a top plate in the upper portion of said housing; a hollow hub mounted in said top plate and rotatable about the vertical axis of said housing and including a frontal cutaway, an internal annular groove, a vertical keyway on the outer surface of said hub opposite said cutaway, and an aperture disposed in said keyway and through the wall of said hub; means on the housing for rotating said hub; a meat spit comprising a yoke having pendant tines with acuminate ends, a head above said yoke and having an annular rib formed thereon, and a tongue having a vertical slot therein; said head being secured to said hub by the fitting matchingly of said head rib in the internal groove of said hub, the projection of the spit tongue through said hub aperture, and the insertion of a key in the said hub keyway and the said vertical tongue slot.

2. In an upright broiler of the class described including a cylindrical housing the combination of; a hub mounted in the upper portion of the housing and rotatable about the vertical axis thereof; motor means for turning said hub; a vertical meat spit comprising a head securable in said hub, a yoke, a central and outer tines having acuminate ends for receiving the meat to be broiled; a plate mounted in the lower portion of said housing and having a bearing hole therein aligned axially with said hub; a spit end-receiver bearingly mounted in said bearing hole and including a centrally disposed hole extending therethrough, outer holes on either side of said central hole but not completely through said end-receiver, and inclined camming surfaces on the inner sides of said outer holes; said spit central tine being positioned in said centrally disposed hole and said outer tines being spaced a distance less than the spacing of said outer holes and positioned in said outer holes and effectively spread by the cooperation of the acuminate ends thereof with the said camming surfaces in said outer holes to retain the meat positioned on said tines from sliding vertically downward.

3. In an upright broiler of the class described including a cylindrical housing the combination of; a top plate in the upper portion of said housing; a hollow hub mounted in said top plate and rotatable about the vertical axis of said housing and including a frontal cutaway, an internal annular groove, a vertical keyway on the outer surface of said hub opposite said cutaway, and an aperture disposed in said keyway and through the wall of said hub; motor means on the housing for rotating said hub, a vertical meat spit comprising a central and outer tines with acuminate lower ends and a yoke joining the upper ends thereof, a head above said yoke and having an annular rib formed thereon, and a tongue extending radially from said rib and having a vertical slot therein; a plate mounted in the lower portion of said housing and having a bearing hole therein aligned axially with said hub; a spit end-receiver bearingly mounted in said bearing hole and including a centrally disposed hole extending therethrough, outer holes on either side of said central hole but not completely through said end-receiver, and inclined camming surfaces on the inner sides of said outer holes; said spit central tine being positioned in said centrally disposed hole, and said outer tines being positioned in the outer holes and effectively spread by the cooperation of the acuminate ends thereof with the said camming surfaces in said outer holes; and said head being secured in said hub by the fitting matchingly of said head rib in the internal groove of said hub, the projection of the spit tongue through said hub aperture, and the insertion of a key in said hub keyway and through the said vertical tongue slot.

GEORGE AMANATIDES.

(References on following page)

REFERENCES CITED

The following references are of record in the file of this patent:

UNITED STATES PATENTS

| Number | Name | Date |
|---|---|---|
| 501,869 | Cacciatori | July 18, 1893 |
| 1,476,215 | Pace | Dec. 4, 1923 |
| 1,630,644 | Troiel | May 31, 1927 |
| 1,753,107 | Black | Apr. 1, 1930 |
| 1,786,300 | Harrison | Dec. 23, 1930 |
| 2,001,116 | Smith | May 14, 1935 |
| 2,047,565 | Kip | July 14, 1936 |
| 2,085,169 | Prood | June 29, 1937 |
| 2,130,259 | Bonaguidi | Sept. 13, 1938 |
| 2,257,399 | Parker | Sept. 30, 1941 |
| 2,479,807 | Bertea | Aug. 23, 1949 |